United States Patent
Eloy et al.

(10) Patent No.: US 11,719,176 B2
(45) Date of Patent: Aug. 8, 2023

(54) VALIDATION OF A SIGNAL FROM A CRANKSHAFT SENSOR

(71) Applicant: Vitesco Technologies GmbH, Regensburg (DE)

(72) Inventors: Stéphane Eloy, Toulouse (FR); Nora Gouzenes, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/611,360

(22) PCT Filed: Jun. 2, 2020

(86) PCT No.: PCT/EP2020/065139
§ 371 (c)(1),
(2) Date: Nov. 15, 2021

(87) PCT Pub. No.: WO2020/245080
PCT Pub. Date: Dec. 10, 2020

(65) Prior Publication Data
US 2022/0228536 A1    Jul. 21, 2022

(30) Foreign Application Priority Data
Jun. 7, 2019   (FR) ..................................... 1906054

(51) Int. Cl.
*F02D 41/00*   (2006.01)
*F02D 41/22*   (2006.01)
(Continued)

(52) U.S. Cl.
CPC ......... *F02D 41/009* (2013.01); *F02D 41/222* (2013.01); *F01L 1/047* (2013.01);
(Continued)

(58) Field of Classification Search
CPC .... F02D 41/00; F02D 41/009; F02D 41/0097; F02D 41/222; F02D 2200/101;
(Continued)

(56) References Cited

U.S. PATENT DOCUMENTS

| | | | | |
|---|---|---|---|---|
| 5,860,406 A | * | 1/1999 | Schmidt | ................ F02D 41/009 123/479 |
| 6,035,826 A | * | 3/2000 | Matsuoka | ............... F02P 7/067 123/406.62 |

(Continued)

FOREIGN PATENT DOCUMENTS

| | | |
|---|---|---|
| CN | 1225415 A | 8/1999 |
| CN | 102032864 A | 4/2011 |

(Continued)

OTHER PUBLICATIONS

International Search Report and Written Opinion for International Application No. PCT/EP2020/065139, dated Jul. 28, 2020, 6 pages.

(Continued)

*Primary Examiner* — Hai H Huynh
*Assistant Examiner* — Johnny H Hoang
(74) *Attorney, Agent, or Firm* — RatnerPrestia

(57) ABSTRACT

A method for switching between a degraded mode and a normal mode for determining the angular position of an internal combustion engine of a vehicle. The method includes the following steps, in a degraded mode: detecting the free space and the teeth of the toothed wheel of the crankshaft from the signal generated by the crankshaft sensor during the rotation of the crankshaft, determining the minimum rotation speed of each combustion top dead center of the crankshaft during a revolution of the crankshaft from the detected free space and the detected teeth, determining the angular positions of the crankshaft corresponding to the minimum determined rotation speeds, and switching to (Continued)

normal mode when, for each combustion top dead center, the difference between the determined angular position of the crankshaft and a reference angular position value is below a predetermined position threshold for at least one revolution of the crankshaft.

12 Claims, 2 Drawing Sheets

(51) Int. Cl.
*F01L 1/047* (2006.01)
*F02D 41/28* (2006.01)

(52) U.S. Cl.
CPC ..... *F01L 2820/042* (2013.01); *F02D 41/0097* (2013.01); *F02D 2041/227* (2013.01); *F02D 2041/286* (2013.01); *F02D 2200/101* (2013.01)

(58) Field of Classification Search
CPC .......... F02D 2041/227; F02D 2041/286; F01L 1/047; F01L 2820/042
See application file for complete search history.

(56) References Cited

U.S. PATENT DOCUMENTS

| | | | |
|---|---|---|---|
| 6,098,604 A | 8/2000 | Nemoto et al. | |
| 6,499,342 B1* | 12/2002 | Gonzales, Jr. | G01M 15/06 73/114.25 |
| 7,197,391 B2 | 3/2007 | Kunibe et al. | |
| 2002/0157649 A1 | 10/2002 | Zimmermann et al. | |
| 2008/0059048 A1* | 3/2008 | Kessler | F02D 35/023 123/435 |
| 2008/0190184 A1* | 8/2008 | Walters | G01M 15/11 73/114.02 |
| 2012/0031357 A1* | 2/2012 | Ervin | F02D 41/1498 123/90.11 |
| 2013/0006496 A1 | 1/2013 | Sherwin et al. | |
| 2013/0092114 A1 | 4/2013 | Pietsch et al. | |
| 2014/0034000 A1* | 2/2014 | Baumann | G01D 5/142 123/90.1 |
| 2015/0268063 A1* | 9/2015 | Lepage | F02D 41/009 324/207.2 |
| 2016/0202146 A1 | 7/2016 | Enomoto | |
| 2017/0037794 A1* | 2/2017 | Ting | F02P 17/12 |
| 2017/0322053 A1* | 11/2017 | Mirassou | G01D 5/24476 |
| 2018/0313288 A1* | 11/2018 | Mazenc | G01D 5/2457 |
| 2018/0372010 A1* | 12/2018 | Zouboff | F02D 41/009 |
| 2021/0215514 A1* | 7/2021 | Zouboff | G01D 5/24485 |

FOREIGN PATENT DOCUMENTS

| | | |
|---|---|---|
| CN | 102791964 A | 11/2012 |
| CN | 105781766 A | 7/2016 |
| CN | 107407266 A | 11/2017 |
| DE | 102009000716 A1 | 8/2010 |
| DE | 102014016416 A1 | 5/2016 |
| FR | 3065283 A1 | 10/2018 |
| JP | 2006200484 A | 8/2006 |

OTHER PUBLICATIONS

International Search Report and Written Opinion for International Application No. PCT/EP2020/065139, dated Jul. 28, 2020, 12 pages (French).
Chinese Office Action for Chinese Application No. 202080041567.7, dated Apr. 15, 2023 with translation, 16 pages.

* cited by examiner

VALIDATION OF A SIGNAL FROM A CRANKSHAFT SENSOR

CROSS REFERENCE TO RELATED APPLICATIONS

This application is the U.S. National Phase Application of PCT International Application No. PCT/EP2020/065139, filed Jun. 2, 2020, which claims priority to French Patent Application No. 1906054, filed Jun. 7, 2019, the contents of such applications being incorporated by reference herein.

FIELD OF THE INVENTION

The invention relates to the field of fuel injection in an internal combustion engine and, more specifically, it relates to a method for managing the synchronization of an internal combustion engine. In particular, the aim of the invention is to enable a return to the normal operating mode of the engine after a transient failure of the signal originating from a crankshaft sensor has been detected. More specifically, the invention relates to a method for validating the elimination of a transient failure of the signal originating from a crankshaft sensor of an internal combustion engine of a vehicle.

BACKGROUND OF THE INVENTION

In a known manner, an internal combustion engine of a vehicle, for example, a motor vehicle, comprises hollow cylinders each demarcating a combustion chamber, into which a mixture of air and fuel is injected. This mixture is compressed in each cylinder by a piston and is ignited so as to cause the piston to translationally move inside the cylinder. The movement of the pistons in each cylinder of the engine rotates an engine shaft, called "crankshaft", allowing, via a transmission system, the wheels of the vehicle to rotate. The air is admitted into the combustion chamber via one or more intake valve(s) that are regularly opened and closed. Similarly, the gases originating from the combustion of the fuel are discharged by one or more exhaust valve(s). In a known manner, the valves are connected to one or more camshaft(s) for controlling their movement in order to successively open and close them.

In a known solution, a crankshaft sensor and a camshaft sensor are mounted in the vehicle and detect, during their rotation, the teeth of targets respectively mounted on the crankshaft and on the camshaft. The target of the crankshaft comprises a predetermined number of evenly spaced apart teeth, as well as a free space of teeth for finding a reference position of the crankshaft. The target of the camshaft comprises a small number of teeth, for example, three or four, that are of different lengths and/or are unevenly distributed so that they can be easily identified. Each sensor generates a signal from the teeth that it detects in order to respectively measure the angular position of the crankshaft and the angular position of the camshaft. During an engine cycle, the crankshaft rotates twice, whereas the camshaft rotates only once.

Engine synchronization can be achieved by combining the two items of information coming from a crankshaft sensor and from one or more camshaft sensor(s). The crankshaft sensor thus allows the position of the one or more piston(s) in the cylinders, and therefore the position of the engine, to be estimated. This position can be estimated with an asymmetry of approximately 360 degrees. This means that the position of the piston in the cylinder is known, but the phase of the combustion cycle in which it is located is not known. This asymmetry is generally called the signature or gap. Thus, the cooperation of the crankshaft signal with the camshaft signal allows the cam edge number viewed by the camshaft sensor to be determined. The cam edge number is determined by associating the number of crankshaft edges received after the signature with the cam edge immediately viewed by the camshaft sensor. Ultimately, this allows the correct phasing to be determined, i.e. in a certain manner, the position of each piston in the combustion cycle.

However, the crankshaft sensor can generate a faulty signal, in particular by detecting a higher or lower number of teeth of the crankshaft target between the two signatures, for example, one tooth more or one tooth less. Metal particles also can be placed at the tooth free space, thus preventing the sensor from detecting the free space.

When a failure of the signal received from the crankshaft sensor is detected, then operating the engine computer in a mode called "degraded" mode is known. In this degraded mode, the position of the engine is only determined from the signal of the camshaft sensor, which on average proves to be more accurate than the signal from the crankshaft sensor when said sensor is defective. However, the target mounted on the camshaft comprises a small number of teeth; the position determined thus is not very precise. The operation of the engine is then no longer optimal, which in particular increases the discharges of polluting gases from the engine.

In a known manner, the signal from the crankshaft sensor is monitored. When the failure is eliminated, the computation returns to a normal operating mode, if, during a certain number of revolutions of the engine, preferably of the order of 1,000 revolutions, no new failure is detected during this number of revolutions. However, such a solution is time consuming. In other words, the duration during which the engine incorrectly operates in a degraded mode is significant.

SUMMARY OF THE INVENTION

Therefore, the aim of an aspect of the invention is to overcome this disadvantage by proposing an effective solution for quickly determining the end of a transient failure of the signal originating from a crankshaft sensor.

An aspect of the invention relates to a method for validating the elimination of a transient failure of the signal originating from a crankshaft sensor of an internal combustion engine of a vehicle, said engine comprising:
a plurality of cylinders;
a crankshaft capable of being driven by the pistons of the cylinders during the operation of the engine and comprising a toothed wheel comprising a free space of teeth corresponding to a reference position of said crankshaft; said crankshaft sensor being configured to detect the teeth and the free space of said toothed wheel;
at least one camshaft, comprising a toothed wheel, the teeth of which are of different lengths and/or are unevenly spaced apart; and
a camshaft sensor configured to detect the teeth of the toothed wheel of said camshaft;
said vehicle comprising a computer configured to determine the angular position of the crankshaft from the detected free space and, in a mode called "normal" mode, to determine the angular position of the engine from the angular position of the crankshaft (synchronized by virtue of the profile of the camshaft) and, in a mode called "degraded" mode, in the event of the failure of the signal originating from the crankshaft sensor, to determine the angular position of the engine only from the angular position of the camshaft, the method, which is implemented by the computer, being characterized in that it comprises the following steps:

detecting, in a degraded mode and when the computer detects a signal from the crankshaft sensor, the free space and the teeth of the toothed wheel of the crankshaft from the signal generated by the crankshaft sensor during the rotation of the crankshaft;

determining the minimum rotation speed of the crankshaft in the vicinity of each combustion top dead center, determined from the duration of the edges of teeth received by the crankshaft sensor upon each rotation of said crankshaft, with the position of the vicinity of each combustion top dead center being determined from the free space and the detected teeth;

determining the angular positions of the crankshaft corresponding to the determined minimum rotation speeds;

switching to normal mode when, for each combustion top dead center, the difference between the determined angular position of the crankshaft and a corresponding reference angular position value is below a predetermined position threshold for at least one crankshaft revolution.

By virtue of the method according to an aspect of the invention, the end of a transient failure of the signal originating from the crankshaft sensor, allowing the switch to the normal mode, is determined in a quick and reliable manner by comparing the angular positions of the minimum speed in the vicinity of the combustion top dead centers of the crankshaft with corresponding reference values, for example, for a given value of the angular opening between the free space of the toothed wheel of the crankshaft and the combustion top dead center of the first cylinder, thus allowing the computer to quickly return to the normal operating mode. In particular, the method is particularly effective since, irrespective of the engine speed, the minimum speed of the crankshaft in the vicinity of each combustion top dead center is clearly identifiable. Moreover, the synchronization of the engine is automatically verified with the method according to an aspect of the invention due to the fact that the position of the free space of the toothed wheel of the crankshaft is distinguished from among those that are possible in an engine cycle.

Advantageously, the method comprises, prior to the step of determining the minimum rotation speed in the vicinity of each combustion top dead center, a step of generating a modeled curve of the speed of the crankshaft by correlating, from a time measurement, the detection of the teeth and of the free space. This allows the minimum rotation speed of each combustion top dead center to be easily determined by analyzing the curve, for example, as taught in document FR 3065283, which is included in the present description by reference. Preferably, the speed curve is modelled by a parabola, which is obtained by the mathematical method of least squares.

Preferably, the speed curve is generated in the vicinity, preferably between −40° and +40°, of each determined angular position of the crankshaft, in order to limit the computations required to generate the curve. Indeed, the tested teeth are those that are located within an angular window, for example, between −40° and +40° of each top dead center.

Advantageously, the rotation speed of the crankshaft is determined when detecting a tooth from the time that has elapsed since the detection of the preceding tooth. This allows the rotation speed to be easily determined from the measured duration and from the known positions of the teeth.

Advantageously, the method comprises a preliminary step of determining reference angular position values, said preliminary step comprising a step of rotating the crankshaft in normal mode, a step of the crankshaft sensor detecting the free space and the teeth of the toothed wheel of the crankshaft, a step of determining the minimum rotation speed in the vicinity of each combustion top dead center of the crankshaft from the detected free space and from the detected teeth during the rotation of said crankshaft, and a step of determining the angular positions of the crankshaft corresponding to the determined minimum rotation speeds, with the value of the reference angular positions being equal to the determined angular positions.

Advantageously, the switch to normal mode is carried out if, for each combustion top dead center, the difference between the determined angular position of the crankshaft and the reference angular position value is below the corresponding predetermined position threshold during a determined number of consecutive cycles of the engine, preferably less than 40. This allows the operating duration in degraded mode to be limited, whilst ensuring reliability in terms of determining the end of a failure. Advantageously, the method comprises a step of computing the difference between the determined rotation speed of the crankshaft, preferably determined from the duration between two detected successive teeth, and each corresponding point of the generated curve, with the switch to normal mode being carried out if the computed difference is less than a speed dependent threshold. This advantageously allows a failure to be detected. Preferably, the speed curve is modeled by a parabola, which is obtained using the mathematical method of least squares, in a manner that is simple and quick per se.

Preferably, the computation of the difference between the rotation speed of the crankshaft and the generated curve is carried out using the computation of a correlation coefficient.

An aspect of the invention also relates to a computer for a vehicle, said vehicle comprising an internal combustion engine, said engine comprising a plurality of cylinders, a crankshaft capable of being driven by the pistons of the cylinders during the operation of the engine and comprising a toothed wheel comprising a free space of teeth corresponding to a reference position of said crankshaft, a crankshaft sensor configured to measure the angular position of said crankshaft from said toothed wheel and at least one camshaft, at least one camshaft, comprising a toothed wheel, the teeth of which are of different lengths and/or are unevenly spaced apart, and a camshaft sensor configured to detect the teeth of the toothed wheel of the camshaft, said computer being configured to determine the angular position of the crankshaft from the detected free space and, in a mode called "normal" mode, to determine the angular position of the engine from the angular position of the crankshaft and from the angular position of the camshaft, and, in a mode called "degraded" mode, in the event of a transient failure of the signal originating from the crankshaft sensor, to determine the angular position of the engine only from the angular position of the camshaft, said computer also being configured to implement the method as described above.

An aspect of the invention further relates to a vehicle comprising an internal combustion engine and a computer as described above, said engine comprising a plurality of cylinders, a crankshaft capable of being driven by the pistons of the cylinders during the operation of the engine and comprising a toothed wheel comprising a free space of teeth corresponding to a reference position of said crankshaft, a crankshaft sensor configured to measure the angular position of said crankshaft from said toothed wheel and at least one camshaft, comprising a toothed wheel, the teeth of which are of different lengths and/or are unevenly spaced apart, and a camshaft sensor configured to detect the teeth of the toothed wheel of the camshaft.

BRIEF DESCRIPTION OF THE DRAWINGS

Further features and advantages of aspects of the invention will become more clearly apparent from reading the following description. This description is purely illustrative and must be read with reference to the accompanying drawings, in which.

DETAILED DESCRIPTION OF THE PREFERRED EMBODIMENTS

An aspect of the invention will be described hereafter in the light of implementation in a motor vehicle. However, any implementation in a different context, in particular for any vehicle comprising an internal combustion engine, for which the angular position needs to be determined, is also covered by an aspect of the present invention.

Figure 1:
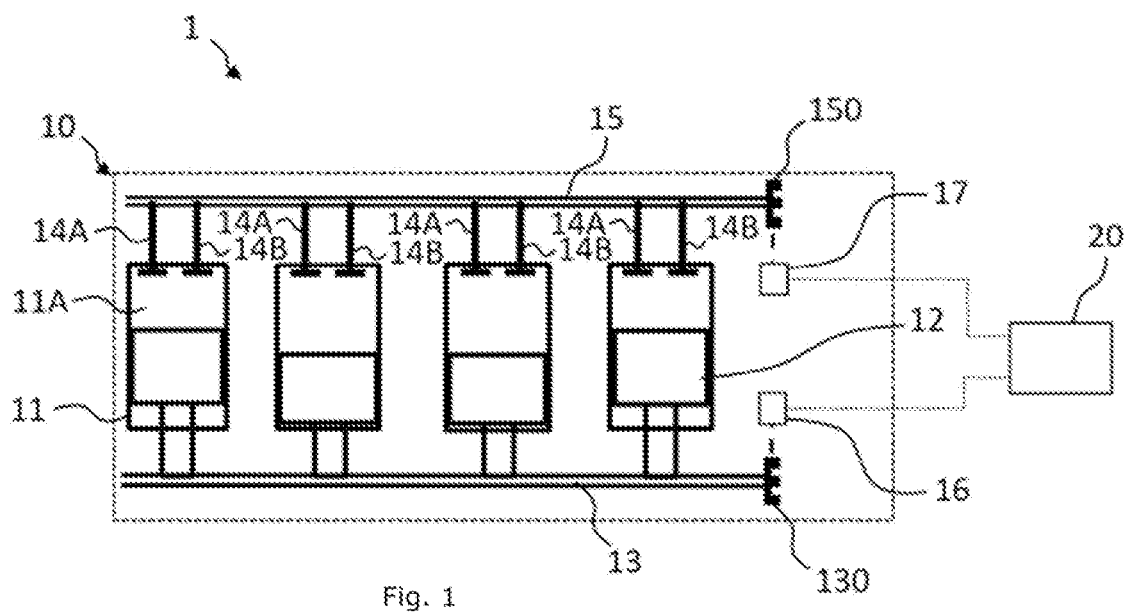
FIG. 1 schematically illustrates an embodiment of a vehicle according to the invention comprising a V-engine viewed from the side.

FIG. 1 schematically shows a side view of an internal combustion engine 10 of a motor vehicle 1. The vehicle 1 further comprises the engine 10, a computer 20.

The internal combustion engine 10 comprises, in this non-limiting example, four cylinders 11 each demarcating a combustion chamber 11A, in which a piston 12 slides, connected to a crankshaft 13 and the movement of which is driven by the compression and the expansion of the gases originating from the compression of an air and fuel mixture introduced into the combustion chambers 11A.

In this example, the engine 10 is of the four-stroke engine type. Furthermore, during operation of the engine 10, four operating phases are required for each cylinder 11: an air and fuel intake phase in the combustion chamber 11A of the cylinder 11, a phase of compressing the obtained mixture, on completion of which phase its combustion will occur, a phase of expanding the gases originating from the combustion of the mixture generating the thrust of the piston 12 and a phase of exhausting the gases out of the combustion chamber 11A. These four phases form an engine cycle that repeats. During the intake phase and the expansion phase, the piston 12 descends to the low position. During the compression phase and the exhaust phase, the piston 12 rises to the high position. The high position is denoted TDC (Top Dead Center). An engine cycle 10 thus comprises four combustion top dead centers TDC1, TDC2, TDC3, TDC4 in FIG. 5, with each combustion top dead center TDC1, TDC2, TDC3, TDC4 by convention identifying the cylinder at the start of the combustion phase. The rotation speed of the engine 10, and in particular the rotation speed of the crankshaft 13 of the engine 10, varies during a cycle and has a minimum value (denoted $V_{mini}$) at the top dead centers TDC1, TDC2, TDC3, TDC4, as will be described hereafter.

The air and the gases are respectively introduced and expelled via intake valves 14A and exhaust valves 14B connected to a camshaft 15. The camshaft 15 activates the intake valves 14A and the exhaust valves 14B. More specifically, the rotating camshaft 15 allows the intake valves 14A and the exhaust valves 14B of each combustion chamber 11A to be alternately opened and closed. Alternatively, the engine 10 of the vehicle could also equally comprise two camshafts, one dedicated to the intake valves 14A and the other dedicated to the exhaust valves 14B. Similarly, in this example, each cylinder 11 is connected to an intake valve 14A and an exhaust valve 14B; however, each cylinder 11 also could be connected to a plurality of intake valves 14A and to a plurality of exhaust valves 14B.

With reference to FIG. 1, the set of pistons 12 is connected to a crankshaft 13, the rotation of which is carried out by the thrust of each piston 12 and allows energy to be transferred by a flywheel and a gearbox (not shown), resulting in the rotation of the wheels of the vehicle 1.

Figure 2:
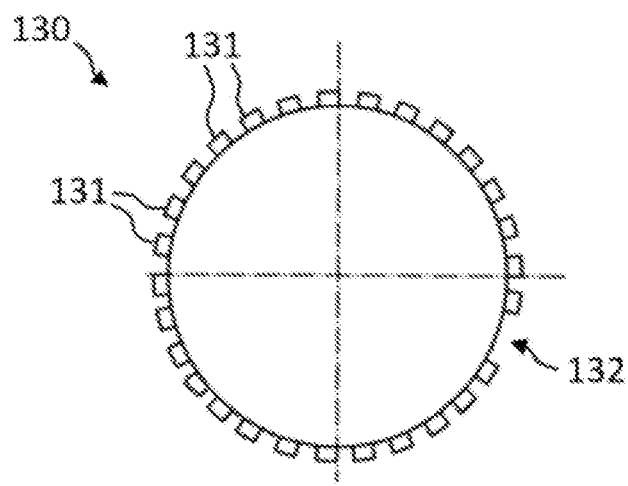
FIG. 2 schematically illustrates an example of a toothed wheel for a crankshaft of the engine of FIG. 1.

The crankshaft 13 comprises a coaxially mounted toothed wheel 130 (commonly called a target by a person skilled in the art), an example of which is illustrated in FIG. 2. This toothed wheel 130 comprises a predetermined number of evenly spaced apart teeth 131, as well as a free space 132 of teeth corresponding to a reference position of the crankshaft 13. It should be noted that the toothed wheel 130 of the crankshaft 13 could comprise more than one free space 132, in particular two free spaces 132, in another embodiment.

Figure 4:
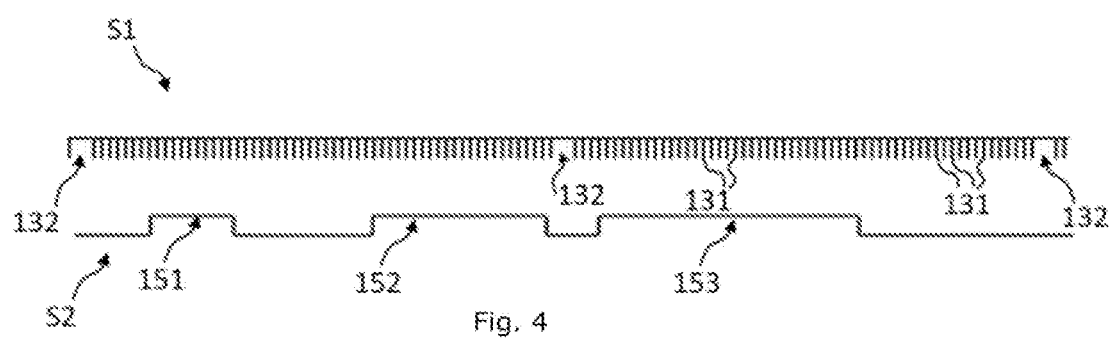
FIG. 4 schematically illustrates signals emitted by a crankshaft sensor and a camshaft sensor mounted opposite the toothed wheels of FIGS. 2 and 3 on an engine cycle.

With further reference to FIG. 1, a position sensor, called crankshaft sensor 16, is mounted opposite the toothed wheel 130 of the crankshaft 13. This crankshaft sensor 16 generates a signal 51, an example of which is illustrated in FIG. 4, comprising rising and falling edges representing the rising and falling edges of the teeth 131 of the toothed wheel 130 of the crankshaft 13. This signal 51 allows the computer 20 to determine the angular position, ranging between 0° and 360°, denoted "°CRK", of the crankshaft 13 relative to the reference position of the toothed wheel 130. In an engine cycle 10, the position of the crankshaft 13 and the number of the revolution in which it is located thus provide the "angular position of the engine 10" that corresponds to the angular position of the crankshaft 13 ranging between 0 and 720°CRK (between 0 and 360°CRK for the first revolution and between 360 and 720°CRK for the second revolution of the engine cycle). As a variant, it should be noted that the crankshaft sensor 16 could be configured to itself detect the free space 132, count the teeth 131 and send this information to the computer 20, without this limiting the scope of the present invention.

Figure 3:
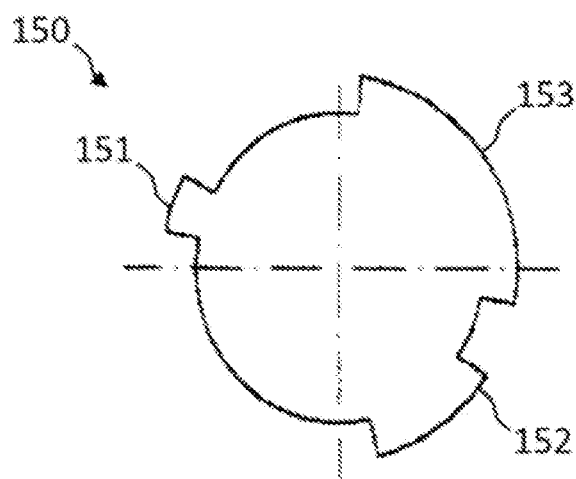
FIG. 3 schematically illustrates an example of a toothed wheel for a camshaft of the engine of FIG. 1.

The camshaft 15 comprises a coaxially mounted toothed wheel 150, an example of which is illustrated in FIG. 3. This toothed wheel 150 comprises a predetermined number of unevenly spaced apart teeth 151, 152, 153, in a manner per se known. With reference to FIG. 1, a position sensor, called camshaft sensor 17, is mounted opposite the toothed wheel 150 of the camshaft 15 so as to allow the angular position of said camshaft 15 to be determined. More specifically, the camshaft sensor 17 is configured to deliver a signal S2, an example of which is illustrated in FIG. 4, comprising rising and falling edges representing the rising and falling edges of the teeth of the toothed wheel 150 of the camshaft 15 and that allows the computer 20, using the signal 51, to determine the angular position, ranging between 0 and 360°CAM, of the camshaft 15 relative to the reference position of the toothed wheel 130 of the crankshaft 13. Since this determination is per se known, it will not be described in further detail herein. As a variant, it should be noted that the camshaft sensor 17 could be configured to itself detect the position of the teeth and send this information to the computer 20, without this limiting the scope of the present invention.

The crankshaft sensor 16 and the camshaft sensor 17 can be, in particular, in the form of sensors, for example, Hall-effect sensors, which are per se known, detecting the rising and falling edges. Alternatively, the computer 20 can be configured to process only the rising edges or the falling edges of the crankshaft sensor 16 and/or the camshaft sensor 17 in order to limit costs.

FIG. 4 shows an example of a signal 51 generated by the crankshaft sensor 16 and an example of a signal S2 concomitantly generated by the camshaft sensor 17 during an engine cycle 10. During an engine cycle 10, the crankshaft 13 rotates twice when the camshaft 15 rotates only once. In other words, the crankshaft 13 rotates twice as much as the camshaft 15. Two free spaces 132 are thus detected on this signal 51 during an engine cycle 10. Furthermore, when a free space 132 is detected, the crankshaft 13 can be in two different positions. However, the fuel injection time depends on the position of the crankshaft 13 relative to the camshaft 15. Furthermore, in order to allow the engine 10 to operate, the camshaft 15 and the crankshaft 13 must be synchronized in order to know the absolute position of the engine 10 and thus optimize the control of fuel injection into the cylinders 11 of the engine 10.

The computer 20, for example, of the type known as an ECU (Electronic Control Unit) or an EMS (Engine Management System), is configured to determine the position of the engine 10 in order to optimize its operation, in particular by optimizing the time of combustion in the engine cycle 10. To this end, the computer 20 is configured to receive the signals 51, S2 respectively emitted by the crankshaft sensor 16 and by the camshaft sensor 17. The computer 20 is configured to identify, on each of these signals 51, S2, the teeth 131, 151, 152, 153 of the targets 130, 150. The computer 20 is also configured to identify, on the signal 51 emitted by the crankshaft sensor 16, the one or more free space(s) 132 of the toothed wheel 130 of the crankshaft 13, with this or these free space(s) 132 each being detected twice during an engine cycle 10.

The computer 20 is configured to switch between two modes for determining the position of the engine 10: a normal mode, in which the computer 20 is configured to determine the angular position of the engine 10 from the angular position of the crankshaft 13, previously synchronized by virtue of the signal originating from the camshaft sensor S2, and a degraded mode in the event of the failure of the signal originating from the crankshaft sensor, wherein the computer 20 is configured to determine the angular position of the engine 10 only from the angular position of the camshaft 15. In other words, in the degraded mode, the computer 20 is configured to determine the position of the engine 10 only from the signal S2 emitted by the camshaft sensor 15. The computer 20 is, for example, particularly configured to switch to degraded mode after an error is detected on the signal 51 emitted by the crankshaft sensor 16.

In normal mode, the computer 20 is configured to, from the position of the camshaft 15 (determined from the signal S2 emitted by the camshaft sensor 17), identify whether the one or more free space(s) 132 have been detected during the first or the second revolution of the crankshaft 13 during an engine cycle 10 in order to synchronize the engine 10. Since such synchronization is known, it will not be described in further detail herein.

The computer 20 is configured to determine the rotation speed of the crankshaft 13 from the signal 51 generated by the crankshaft sensor 16. To this end, the computer 20 is configured to measure the duration between two teeth 131 successively detected on the signal 51. Alternatively, the computer 20 can be configured to determine the time, in relation to a clock of the computer 20, at which each tooth 131 is detected in order to determine the duration between two successively detected teeth 131. The computer 20 is then configured to compute the speed of the crankshaft 13 when a tooth 131 is detected from the duration determined from the detection of the preceding tooth 131.

Figure 5:
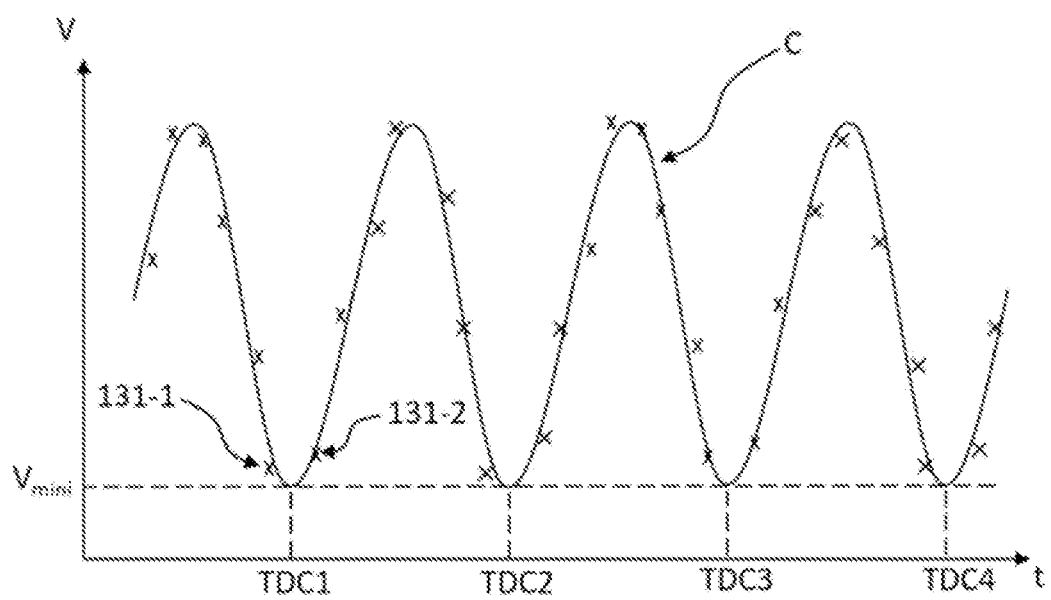
FIG. 5 schematically illustrates a rotation speed curve of the crankshaft determined from the signal of FIG. 4.

The computer 20 is then configured to generate a curve C representing the rotation speed of the crankshaft 13 over time, an example of which is illustrated in FIG. 5. This curve C is generated from the different speeds determined for each tooth 131 of the toothed wheel 130 of the crankshaft 13. Such a curve C particularly can be generated in a known manner using the method of least squares. Such a curve C has, at the minimums corresponding to the combustion top dead centers TDC1, TDC2, TDC3, TDC4, a parabolic shape representing the speed variations of the crankshaft 13 around said minimums.

The computer 20 is configured to determine, from the generated curve C, the minimum speed $V_{mini}$ of rotation of each combustion top dead center TDC1, TDC2, TDC3, TDC4 of the crankshaft 13. This minimum speed $V_{mini}$ is detected in the vicinity of a combustion top dead center TDC1, TDC2, TDC3, TDC4 of the engine cycle 10. With the engine cycle 10 comprising four top dead centers TDC1, TDC2, TDC3, TDC4 in this example, the computer 20 is configured to determine four minimum speeds $V_{mini}$, with each minimum speed $V_{mini}$ corresponding to one of these top dead centers TDC1, TDC2, TDC3 or TDC4.

The computer 20 is configured to determine the angular positions of the crankshaft 13 corresponding to the determined minimum speeds $V_{mini}$. Each angular position particularly can be determined by extrapolation from the known position of the detected teeth 131. In the example illustrated in FIG. 5, the angular position corresponding to a minimum speed $V_{mini}$ of rotation ranges between two consecutive teeth 131-1, 131-2 of the toothed wheel 130. Furthermore, determining this angular position by extrapolation allows a precise position to be obtained.

Advantageously, with the angular position of the combustion top dead centers TDC1, TDC2, TDC3, TDC4 being known per structure and being recorded in the ECU, the curve C is only generated in the vicinity of the combustion top dead centers TDC1, TDC2, TDC3, TDC4 in order to limit the computations. In particular, the curve C can be generated from the measurements carried out for the four preceding teeth and the four teeth following a combustion top dead center TDC1, TDC2, TDC3, TDC4.

The computer 20 is configured to compare, at each combustion top dead center TDC1, TDC2, TDC3, TDC4, the determined angular position with a reference angular position value associated with the minimum speed $V_{mini}$ of rotation of the considered crankshaft 13. The computer 20 is configured to determine the end of the transient failure of the signal originating from the crankshaft sensor 16 and to switch the operation of the engine 10 to normal mode when the difference between the determined angular position and the reference value is below a position threshold during a predetermined number of revolutions of the crankshaft 13, for example, at least 10, preferably of the order of 40 revolutions.

The reference value is predetermined when the engine 10 operates in normal mode. To this end, the computer 20 is configured to generate a speed curve of the crankshaft 13 in order to determine a minimum speed $V_{mini}$, as previously described, but this time in normal mode in order to determine the reference value. This predetermination can be carried out in the factory or over the lifetime of the vehicle 1. This reference value is stored in a non-volatile, or permanent, memory of the computer in order to be able to act as a reference.

The computer 20 is also configured to detect whether a measured speed is far removed from the generated curve C. Such a difference represents a failure of the signal originating from the crankshaft sensor 16, which allows the engine 10 to be kept in a degraded mode. The difference between a measured speed and the generated curve C particularly can be determined from the computation of a correlation coefficient, denoted $R^2$. This coefficient, which is per se known to a person skilled in the art, allows the difference between the generated curve C and the measured values to be quantified.

Using the correlation coefficient $R^2$ allows a failure to be detected, in particular two failures that compensate each other and thus cannot be detected when determining the minimum speed $V_{mini}$. If, for example, the crankshaft sensor 16 views, in the same revolution (between two free spaces), an additional tooth and a missing tooth, the total number of total teeth will be correct, while an error may have occurred. The correlation coefficient $R^2$ allows an additional tooth and/or a missing tooth to be detected on the sample, with the measured speed values not corresponding to the values determined on the curve C (with the difference being significant for the measurements with an erroneous position).

The previous description will be advantageously used in a degraded mode when the failure of the crankshaft sensor 16 is no longer detected, in order to requalify the received signal and thus return to normal mode.

An embodiment of the method according to the invention will now be described.

Firstly, the engine 10 is started. In other words, the crankshaft 13 and the camshaft 15 are rotated by the combustion produced in the cylinders 11.

In a preliminary step, the engine 10 operates in normal mode. In other words, no failure is detected.

The crankshaft sensor 16 and the camshaft sensor 17 then respectively detect the teeth 131, 151, 152, 153 and the one or more free space(s) 132 of the toothed wheel 130, 150, opposite which they are placed, and generate signals 51, S2. The crankshaft sensor 16 transmits the signal 51 that it generates to the computer 20, and the camshaft sensor 17 transmits the signal S2 that it generates to the computer 20, in order to allow the computer 20 to determine the position of the engine 10.

The computer 20 also determines the rotation speed of the crankshaft 13 when a tooth 131 is detected, in particular from the measurement of the duration since the detection of the preceding tooth 131. A speed curve is then generated from the different speeds determined using a method of the least squares type.

Finally, the computer 20 determines the minimum speed $V_{mini}$ of rotation of the crankshaft 13 during an engine cycle 10 for each combustion top dead center TDC1, TDC2, TDC3, TDC4. Then, the computer 20 determines the angular position of the crankshaft 13 corresponding to the minimum speed $V_{mini}$ of rotation thus determined for each combustion top dead center TDC1, TDC2, TDC3, TDC4. Each angular position is then recorded in a non-volatile memory zone of the computer 20 as a reference angular position value.

During the operation of the engine 10, the computer 20 also detects a failure of the signal originating from the crankshaft sensor 16. To this end, the computer 20 determines the number of teeth 131 detected during one revolution of the crankshaft 13, i.e. between two detections of the free space 132. If the number of detected teeth 131 is different, in particular lower or higher, from the number of teeth 131 that the toothed wheel 130 comprises, then the computer 20 detects a failure.

The computer 20 then switches the operation of the engine 10 to a degraded mode. In this degraded mode, the computer 20 no longer uses the signal 51 generated by the crankshaft sensor 16 to determine the position of the engine 10, unlike the normal mode.

During the degraded mode, and when the computer detects a signal originating from the crankshaft sensor, the crankshaft sensor 16 detects the teeth 131 and the one or more free space(s) 132 of the toothed wheel 130 and generates a signal 51. The crankshaft sensor 16 transmits the signal 51 that it generates to the computer 20.

The computer 20 also determines the rotation speed of the crankshaft 10 when a tooth 131 is detected and generates a speed curve C from the different determined rotation speeds, as previously described.

The computer 20 then determines the minimum speeds $V_{mini}$ of rotation of the crankshaft 13 during an engine cycle, as well as the angular positions of the crankshaft 13 corresponding to the determined minimum speeds $V_{mini}$ of rotation. The computer can define these speeds and the associated positions once per engine cycle, or between two consecutive top dead centers in order to determine these parameters, without this limiting the scope of the present invention.

The computer 20 then compares the determined angular positions with the reference values. The computer 20 repeats these operations during a plurality of revolutions of the crankshaft 13, for example, around ten (that is approximately forty comparisons for a four-cylinder engine). If the difference between a determined angular position for each revolution of the crankshaft 13 and the corresponding reference value is consecutively below a position threshold, preferably of the order of 2°CRK, the computer 20 switches the operation of the engine 10 to normal mode.

Preferably, the computer 20 comprises a counter, the value of which is incremented upon each crankshaft revolution 13 if the difference between the determined angular position upon one revolution of the crankshaft 13 and the considered reference value is below the position threshold. The switch to normal mode occurs when the value of the counter reaches a determined value, for example, forty.

In the degraded mode, the computer 20 also determines the correlation coefficient $R^2$ of the generated curve C in order to detect failures. To this end, the computer 20 compares the value of the determined coefficient with a speed dependent reference value. If the value of the coefficient is greater than this reference value, the operation of the engine 10 does not switch to normal mode.

Similarly, if the computer 20 detects a failure during the degraded mode, in particular by counting the number of teeth 131 detected during one revolution of the crankshaft 13, the switch to normal mode is interrupted, and the previously described steps will be repeated when the failure has been eliminated.

By virtue of these many tests, the switch to normal mode from the degraded mode is reliable. In other words, the switch to normal mode is only carried out if no failure has been detected by one of these tests. Moreover, this enables switching to normal mode after a limited number of revolutions of the crankshaft, for example, less than ten, which limits the operating duration of the engine 10 in degraded mode and thus limits polluting discharges.

The invention claimed is:

1. A method for validating an end of a transient failure of a signal originating from a crankshaft sensor of an internal combustion engine of a vehicle, said engine comprising a plurality of cylinders; a crankshaft configured to be driven by pistons of the cylinders during operation of the engine and comprising a toothed wheel comprising a plurality of teeth and a free space without teeth corresponding to a reference position of said crankshaft; said crankshaft sensor being configured to detect the teeth and the free space of said toothed wheel; at least one camshaft, comprising a camshaft toothed wheel having camshaft teeth of different lengths or unevenly spaced apart; and a camshaft sensor configured to detect the camshaft teeth of the camshaft toothed wheel the method, which is implemented by a computer configured to determine an angular position of the crankshaft from the detected free space, comprising:

- in a normal mode, determining an angular position of the engine from the angular position of the crankshaft and an angular position of the camshaft;
- switching to a degraded mode when a failure of the signal originating from the crankshaft sensor is detected, wherein during the degraded mode, the angular position of the engine is determined only from the angular position of the camshaft;
- detecting, during the degraded mode, the free space and the teeth of the toothed wheel of the crankshaft from a signal generated by the crankshaft sensor during rotation of the crankshaft;
- determining a duration of edges of teeth received by the crankshaft sensor upon each rotation of the crankshaft;
- determining a minimum rotation speed of the crankshaft in a vicinity of each combustion top dead center from the duration of the edges of teeth received by the crankshaft sensor upon each rotation of said crankshaft, with a position of the vicinity of each combustion top dead center being determined from the detected free space and the detected teeth;
- determining angular positions of the crankshaft corresponding to the determined minimum rotation speeds; and
- switching to the normal mode when, for each combustion top dead center, a difference between the determined angular position of the crankshaft and a corresponding reference angular position value is below a predetermined position threshold for at least one crankshaft revolution.

2. The method as claimed in claim 1, further comprising, prior to determining the minimum rotation speed of the crankshaft in the vicinity of each combustion top dead center, generating a modeled curve of the speed of the crankshaft by correlating, from a time measurement, the detection of the teeth and the free space.

3. The method as claimed in claim 2, wherein the modeled speed of the curve is generated between −40° and +40° of each determined angular position of the crankshaft.

4. The method as claimed in claim 3, wherein the rotation speed of the crankshaft is determined when detecting a tooth from a time that has elapsed since the detection of the preceding tooth.

5. The method as claimed in claim 2, wherein the rotation speed of the crankshaft is determined when detecting a tooth from a time that has elapsed since the detection of the preceding tooth.

6. The method as claimed in claim 2, further comprising computing the difference between the determined rotation speed of the crankshaft and the generated curve, with the switch to normal mode being carried out if the computed difference is less than a speed dependent threshold.

7. The method as claimed in claim 6, wherein the computation of the difference between the rotation speed of the crankshaft and the generated curve is carried out using the computation of a correlation coefficient.

8. The method as claimed in claim 1, further comprising a preliminary step of determining reference angular position values, said preliminary step comprising rotating the crankshaft in normal mode, detecting, by the crankshaft sensor, the free space and the teeth of the toothed wheel of the crankshaft, determining the minimum rotation speed in the vicinity of each combustion top dead center of the crankshaft from the free space and from the detected teeth during the rotation of said crankshaft, and determining the angular positions of the crankshaft corresponding to the determined minimum rotation speeds, with the value of the reference angular positions being equal to the determined angular positions.

9. The method as claimed in claim 1, wherein the switch to the normal mode is carried out if, for each combustion top dead center, the difference between the determined angular position of the crankshaft and the reference angular position value is below the corresponding predetermined position threshold during a predetermined number of consecutive cycles of the engine.

10. A computer for a vehicle, said computer being configured to implement the method as claimed in claim 1.

11. A vehicle comprising an internal combustion engine and the computer as claimed in claim 10.

12. The method as claimed in claim 1, wherein the failure of the signal originating from the crankshaft sensor is detected when a number of the teeth of the toothed wheel of the camshaft detected during the at least one crankshaft revolution is different from a predetermined number of the teeth of the toothed wheel of the camshaft.

* * * * *